United States Patent [19]
Bremer et al.

[11] Patent Number: 5,184,123
[45] Date of Patent: Feb. 2, 1993

[54] METHOD OF AND ARRANGEMENT FOR REPRESENTING TRAVEL GUIDING INFORMATION

[75] Inventors: Wolfgang Bremer; Peter Knoll; Frieder Heintz, all of Ettlingen, Fed. Rep. of Germany

[73] Assignee: Robert Bosch GmbH, Stuttgart, Fed. Rep. of Germany

[21] Appl. No.: 578,897

[22] Filed: Sep. 4, 1990

Related U.S. Application Data

[63] Continuation-in-part of Ser. No. 322,775, Mar. 3, 1989, abandoned.

[30] Foreign Application Priority Data

Mar. 3, 1988 [DE] Fed. Rep. of Germany ....... 3806848

[51] Int. Cl.⁵ .............................................. G08G 1/123
[52] U.S. Cl. ................................... 340/995; 340/988; 364/449
[58] Field of Search ............... 340/988, 990, 995, 903, 340/466, 441, 996; 73/178 R; 364/449

[56] References Cited

U.S. PATENT DOCUMENTS

| 3,026,498 | 3/1962 | Galliers | 340/435 |
| 3,824,534 | 7/1974 | Straumsnes | 340/988 |
| 4,731,526 | 3/1988 | Knoll et al. | 235/462 |
| 4,774,672 | 9/1988 | Tsunoda et al. | 340/995 |
| 4,782,447 | 11/1988 | Ueno et al. | 364/449 |
| 4,888,699 | 12/1989 | Knoll et al. | 340/995 |

FOREIGN PATENT DOCUMENTS

| 2727311 | 12/1978 | Fed. Rep. of Germany | 340/996 |
| 3806842 | 9/1989 | Fed. Rep. of Germany | 340/995 |
| 3806848 | 9/1989 | Fed. Rep. of Germany | 340/990 |
| 0057117 | 3/1989 | Japan | 340/995 |
| 2142143 | 1/1985 | United Kingdom | 340/988 |

Primary Examiner—Jin F. Ng
Assistant Examiner—Brent A. Swarthout
Attorney, Agent, or Firm—Michael J. Striker

[57] ABSTRACT

In accordance with a method of and arrangement for representing point-referenced travel guiding information, especially in power vehicles on a display of an electronic guiding and orienting device, a desired travel route is input, and a travel guiding information is represented at a distance from a reference point determined in accordance with the vehicle speed.

8 Claims, 3 Drawing Sheets

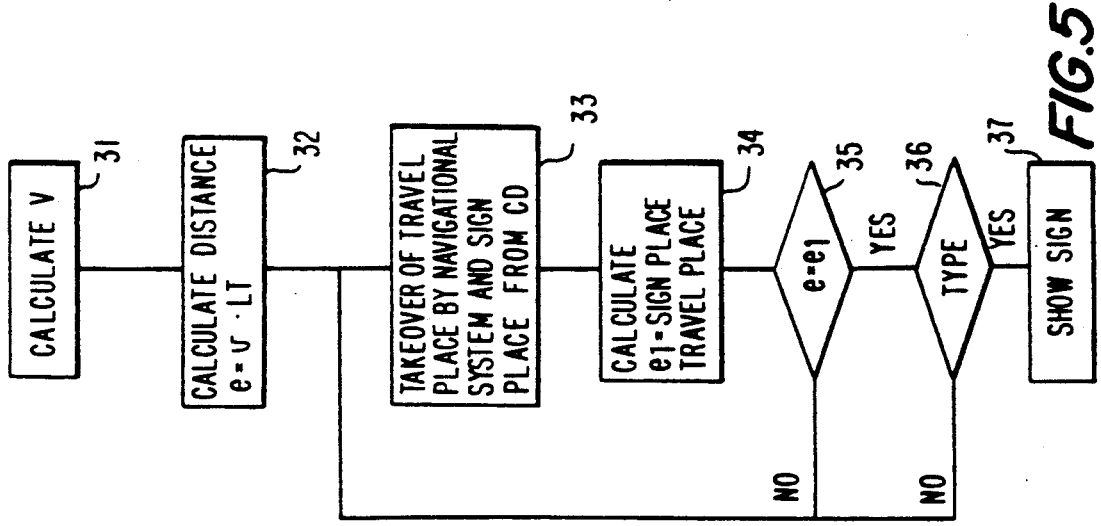

METHOD OF AND ARRANGEMENT FOR REPRESENTING TRAVEL GUIDING INFORMATION

RELATED APPLICATIONS

This application is a continuation-in-part of application Ser. No. 322,775 filed on Mar. 3, 1989, and now abandoned, and entitled "Method of and an Arrangement for Representing Travel Guiding Information".

BACKGROUND OF THE INVENTION

The present invention relates to a method of representing point-referenced travel guiding information, especially in power vehicles on a display of an electronic guiding and orienting device which serves for receiving the desired traveling route and in some cases further data. The present invention also relates to an arrangement for representing point-referenced travel guiding information.

Electronic guiding and orienting devices particularly for power vehicles are known. They include a microprocessor which continuously receives the measuring values from an electronic compass and a path pulse generator, and with the available introduced or stored data computes the instantaneous location of the power vehicle or its traveling route. It indicates on a display the instantaneous aerial linear distance and direction from the point of destination and in some cases further symbols. This direction indicator of the point of destination provides however only the astronomical direction in which the point of destination is located. However, it does not take into consideration the road course and geographic features.

It is important to provide such devices with auxiliary means, for example with transparent digitizers or digitalizer screens for indicating the desired traveling route and in some cases further information, which later during the navigation process can be indicated on a display. The display for example shows a stylized land map portion in which continuously the instantaneous position of the vehicle is introduced. These indicators are, however, readable by the driver during travel with difficulties.

Further systems are known in which the street plan in digitalized form can be stored on a suitable carrier, and depending on the data set the driver can be given at each intersection a recommendation for turning the vehicle. For example the data can be provided on a CD (compact-disc). Before reaching an intersection, the stylized symbol of the intersection is indicated to the driver and then it is highlighted in which direction the driver must turn. The latter system has however the disadvantage that the determination of the digitalized data is very expensive.

SUMMARY OF THE INVENTION

Accordingly, it is an object of the present invention to provide a method of representing travel guiding information and an arrangement for representing the same, which avoid the disadvantages of the prior art.

In keeping with these objects and with others which will become apparent hereinafter, one feature of the present invention resides, briefly stated, in a method of reproducing point-referenced travel guiding information, particularly for motor vehicles, on a display of an electronic guiding and orienting device, in which the travel guiding information is delivered at a predetermined distance from a reference point.

In an inventive arrangement for representing travel information, means is provided for delivering on the display the travel guiding information at a distance from a reference point.

When the method is performed and the arrangement is designed in accordance with the present invention, the point-referenced travel guiding information such as, for example, the information about the required turning at intersections is delivered timely at a predetermined distance before reaching the reference point, for example, the intersection. As a result, the driver is warned and can timely take steps to change the lane for making a respective turn. In this situation the driver is not excessively distracted by the travel guiding information. Finally, the method and arrangement in accordance with the present invention are inexpensive.

The present invention provides for different possibilities of adjusting the time delay or time interval between the display of the travel guiding information or its indication as to a concrete point and the actual reaching of the respective point. For example, this time delay can be fixedly preselected and amount to approximately 1-30 seconds. On the other hand, the time preselection can be variable so that the travel guiding information is delivered in a fixed distance from the vehicle prior to the next reference point on the desired traveling path. The travel guiding information is delivered for such points which lie at predetermined path length from the actual point in which the vehicle is located. As a result, the driver of the vehicle obtains the traveling guide information for example 500 meter before an intersection and not when the vehicle is already located in the region of the intersection.

Advantageously, the fixed distance increases linearly with increasing instantaneous speed of the vehicle. When the driver expects a distance for example of 500 meter at 50 km/h, then at the speed of 70 km/h, a value of the distance is 700 meter in accordance with the present invention.

For preventing the situation when the driver, for example in the event of two intersections following at a short distance from one another, receives the travel guiding information for the second intersection while he is still on the way to the first intersection, the second travel guiding information can be blocked for such a time until the first reference point or in this case the first intersection has been passed.

The best travel guiding information indicator which requires the minimal attention of the driver is a direction arrow on a display. Advantageously, it is formed in the primary field of vision of the driver. The primary field of vision is a field of vision which can be detected by the driver only by movement of his eyes.

In accordance with a further feature of the present invention, advantageously the travel guiding information is introduced by a driver on a transparent digitalizer screen for the start of the travel. This information can be information related to the reference point, such as for example speed limits and/or requirements for intermediate stops.

In accordance with an advantageous feature of the inventive arrangement, the arrangement is provided with a continuous indicator of the travel guiding information on the display, and the display is arranged in the primary field of vision of the driver.

The traveling guide information indicator is formed as an arrow which represents the recommended or desired traveling direction in correspondence with the desired traveling route.

Finally, the control unit which controls the distance of delivering the travel guiding information from a reference point is provided with a time and/or path input device for selecting the time lead.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows a diagram of information data stored for different routes; and

FIG. 5 shows a flow chart for conducting the vehicle navigation process according to the invention.

DESCRIPTION OF THE PREFERRED EMBODIMENTS

Figure 1:
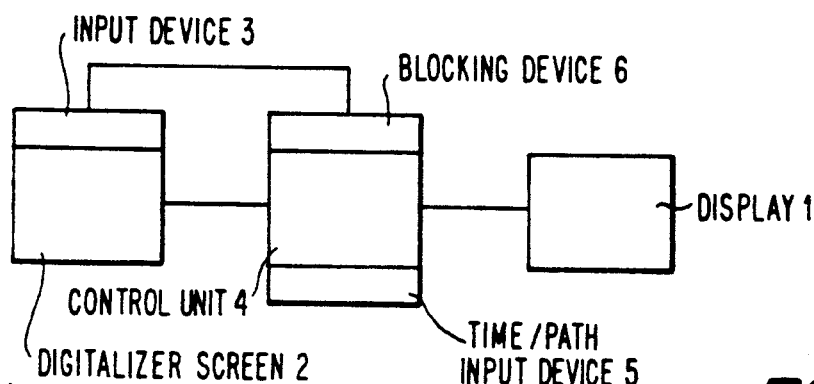
FIG. 1 shows a view of a schematic block diagram of an arrangement for representing travel guiding information.

An arrangement for representing travel guiding information on an indicating device of an electronic guiding and orienting device and more particularly on a display 1 of the indicating device is schematically shown in FIG. 1. It has also a transparent input or digitalizer screen 2 for introducing the desired traveling route. Preferably, on the edge of this digitalizer screen 2, a further input device 3 is provided for introducing fixed reference points such as for example intersections and other data. The digitalizer screen 2 is directly connected with a control unit 4. The travel guiding information is indicated on the display 1 through the control unit 4. Finally, a time and/or path input device 5 and a blocking device 6 are provided in the control unit 4.

Figure 2:
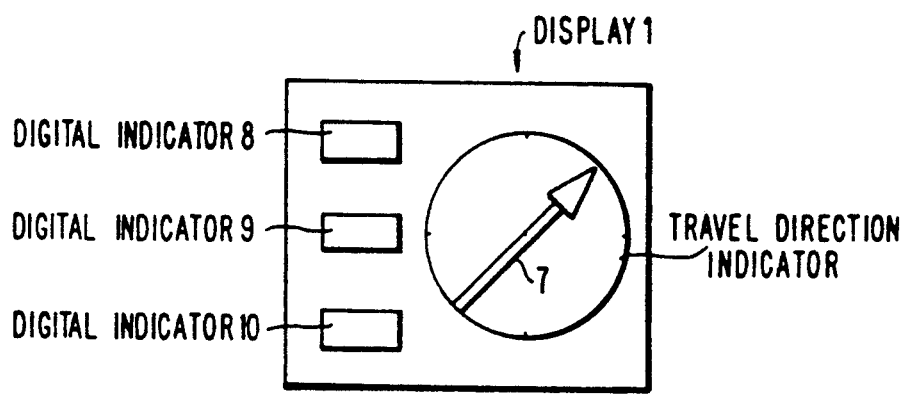
FIG. 2 shows a display of the arrangement in accordance with the present invention.

As can be seen from FIG. 2, the display 1 has a clearly recognizable arrow 7 which provides the travel guiding information in form of a direction indicator. The display 1 can further have for example digital indicators 8 and 9 to indicate a distance from a point of destination, the astronomical direction in which the point of destination is located, and also the expected time required for reaching the point of destination.

The method in accordance with the present invention is performed and the inventive arrangement operates in the following manner.

A desired plan is placed under the transparent digitalizer screen 2. With a not shown digitalizing pin, the desired route is reproduced on the plan, while the pin contacts the digitalizer screen. With the guiding and orienting device, the point which is contacted by the digitalizing pin on the digitalizer screen 2 is automatically detected and supplied in a storage. Further, during representing of the travel route by means of the digitalizing pin, different inputs are also stored by pressing the keys of the input device 3. By pressing respective keys, the driver inputs into the time and/or path input device the time at which point-referenced travel guiding information must be displayed. By actuating the blocking device 6, the driver can input simultaneously the fixed reference point which must be first passed before the next following travel guiding information is to be indicated on the display 1.

After the inputting of the above mentioned information, the driver of the vehicle can drive along the inputted route. A travel direction indicator in form of an arrow 7 is produced on the display. Before reaching the next reference point such as an intersection or a branching, it shows the driver the traveling route to be followed. Therefore the driver of the vehicle is in such a situation in which he can timely adjust its travel to the process of turning the vehicle. When the driver passed the respective intersection, the next traveling guide information for the next reference point is produced on the display 1.

Simultaneously with the indication of the travel directional arrow 7, further indications can be provided in digital or analog form on the devices 8–10.

It is to be understood that the driver also can change during the travel the time value by which the travel guiding information precedes the actual instantaneous position of the vehicle. This can be performed by actuation of time and/or path input device 5.

Figure 3:
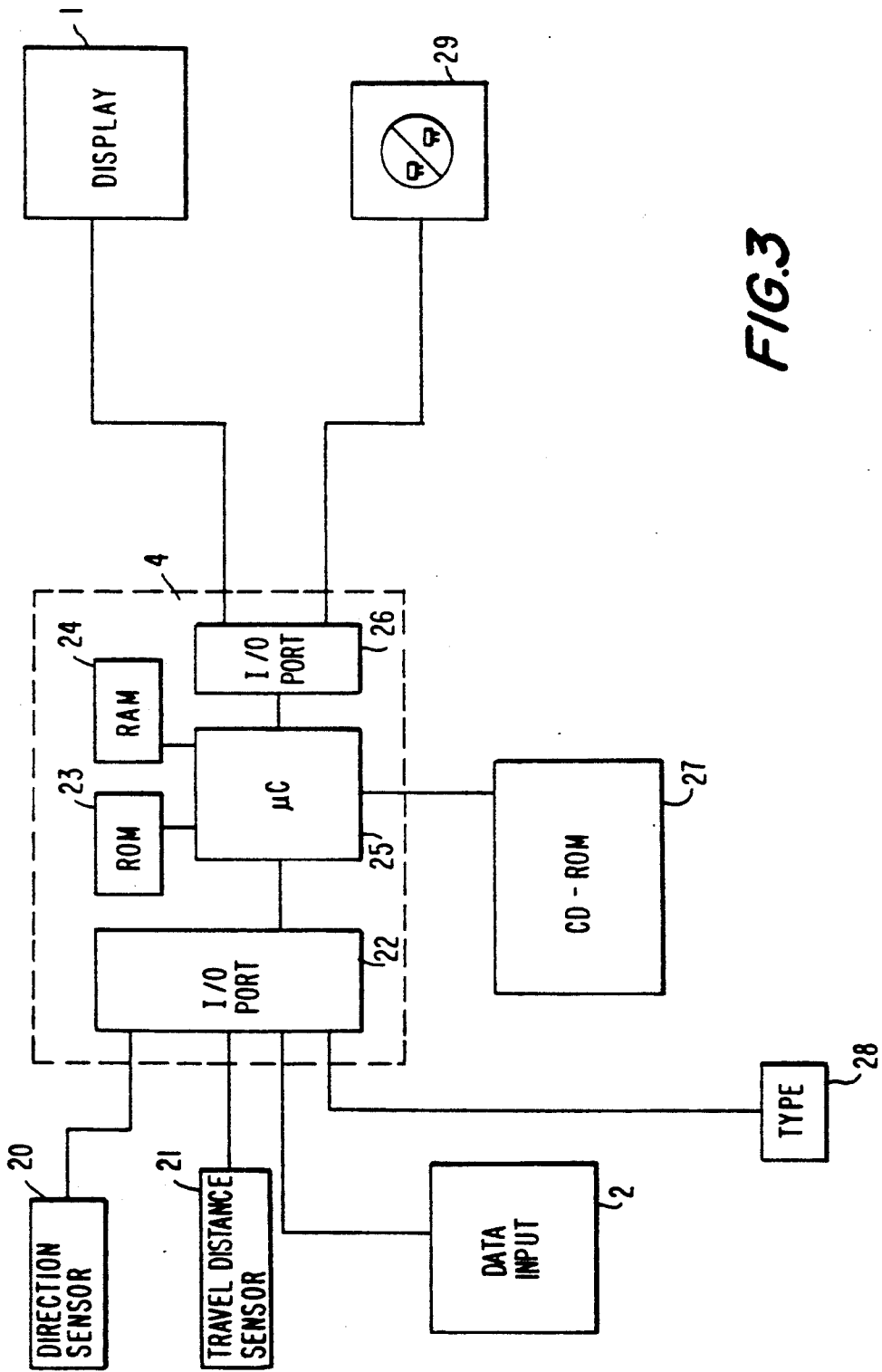
FIG. 3 shows a more detailed view of the block diagram of FIG. 1.

FIG. 3 shows the block-diagram of FIG. 1 in more detail. The digitalizer screen 2 serves for inputting data to the control unit 4. The control unit includes an input device 22 through which navigation data from direction sensor 20 and travel distance sensor 21 are input. The travel distance sensor 21 may be formed as a speed sensor for determining the speed of a moving vehicle. The assembly 28 serves for input data characterizing the vehicle, whether it is a passenger car, a truck, a bus, or a petrol vehicle, or a total weight of the vehicle. These data are also input through the input device 22 of the control unit 24. The control is effected by a microprocessor 25 comprising a read-only memory (ROM) 23 which contains the program, and a random access memory (RAM) 24 which serves for temporary storage of processed, by microprocessor, data. The CD-ROM 27 which serves as a mass storage for navigation data, communicates these data to microprocessor. The microprocessor 25 has another input/output device 26 through which indicating data are communicated to the display 1 and to indicator 29 which also shows the traffic signs. Of course, the display 1 and the indicator 29 may also be combined in a single display. Among the information stored in CD-ROM 27, for each route, there are given what signs at what kilometer are present and to what type of a vehicle, these traffic signs are applicable. For example, at 5-th kilometer of road A7, there is a sign "Passing is prohibited" which applies to all vehicles. At 15-th kilometer, i.e., there is a sign "Speed limit 50 km/hr which applies only to trucks". At 20-th kilometer, there is a sign "Intersection." Further, i.e. for route 25, at 28-th kilometer, there is a sign "Movement of vehicle with dangereous cargo is prohibited," which applies likewise to petrol vehicle. For controlling navigation, the microprocessor should now proceed from an actual location of a vehicle among the known locations. If, for example, the vehicle starts at the beginning of road A7, at 0 kilometer, the microprocessor will retrieve from CD-ROM 27 all signs for, i.e., up to 10-th kilometer of road A7 that are stored in CD-ROM 27.

Processing of the information will be discussed with reference to FIG. 5. In accordance with the information received from the travel distance sensor 21, in a known manner, the instant speed V of the vehicle will be calculated at position 31. At position 32, only the distance e will be determined at which the information about appearance of signs will be provided. At that, the common reaction time of a driver is taken into account. This factor is designated in the equation by T. The distance at which the signs will appear, is increased with increase in a vehicle speed because, with a driver's reaction time being the same, the driver should be notified earlier. The equation of step 32 clearly shows that, with the T being constant, i.e., 10 sec., the distance e is directly proportional to the vehicle speed. When the distance at which appearance of the sign display is needed, is determined, the travel location and sign location is retrieved from the vehicle navigation system 27.

The retrieval of the necessary information is taking place at position 34 which designates the "sign place." At this position, also the actual or instant location of the vehicle is displayed. $e_1$ represents the distance from the actual location to the "sign" place. If the calculated distance $e_1$ is equal to the distance e, at the inquiry position 35, a signal "yes" is provided, and at the inquiry position 36, it is determined whether the particular sign(s) should be displayed. Whether the sign should appear depends on the type of the vehicle, because as shown in FIG. 4, not all signs apply to all vehicles. At the position 37, only those signs will appear that apply to this type of a vehicle. Thus, for a petrol vehicle, all signs will appear. For a truck, only first three signs will appear. For a passenger car, only first and third signs will apear.

However, if the distance $e_1$ is greater than e, a signal "no" is provided at the inquiry position 35, and the steps taken at positions 31-35 are repeated until a "yes" signal appears at the inquiry position 35. The display of respective signs takes place at position 37.

It is clear from the foregoing description, a particular sign will appear only when the vehicle is at the predetermined distance e from the sign determined in accordance with the vehicle speed.

The subsequent sign, i.e., at the next crossing is not shown until the vehicle reaches the first sign, and only at a second predetermined distance. The showing of the second sign is programmed in such a way that it may be shown only when the distance $e_1$ is 0.

It will be understood that each of the elements described above, or two or more together, may also find a useful application in other types of constructions differing from the types described above.

While the invention has been illustrated and described as embodied in a method of and arrangement for representing point-referenced travel guiding information, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of representing point-referenced travel guiding information on a digitalizer screen forming a display of an electronic guiding and orienting device of a vehicle, said method comprising the steps of inputting a desired travel route on the digitalizer screen before start of travel along the desired travel route; representing the travel guiding information on the digitalizer screen at a distance from reference points including representing first travel guiding information required for a first reference point and second travel guiding information required for a second reference point; blocking the second travel guiding information for such a time until the vehicle reaches the first reference point for which the first travel guiding information is required; and adjusting the distance linearly in accordance with an instantaneous speed of the vehicle so that the distance increases with an increase of the instantaneous speed of the vehicle.

2. A method as defined in claim 1, wherein said blocking step includes blocking until the vehicle passes the first reference point which has been fixedly predetermined before start of travel along the desired travel route.

3. A method as defined in claim 1, wherein said blocking step includes blocking until the vehicle passes the first reference point which is predeterminable during travel along the desired travel route.

4. A method as defined in claim 1, wherein said representing step includes representing the travel guiding information in form of a directional arrow on the display.

5. A method as defined in claim 1, wherein said representing step includes representing on the display the travel guiding information in a primary field of vision of a vehicle driver.

6. An arrangement for representing point-referenced guiding information, comprising a digitalizer screen forming a display on which a desired travel route is input before start of travel along the desired travel route; means for sensing instantaneous speed of a vehicle moving along the desired travel route; means for representing travel guiding information on the digitalizer screen at a distance from reference points including first travel guiding information required for a first reference point and second guiding information required for second reference point, said representing means including a blocking device for blocking representation of the second travel information required for the second reference point until the vehicle passes the first reference point for which the first travel guiding information has been provided; and means for adjusting the distance lienarly in accordance with an instantaneous speed of the vehicle.

7. An arrangement as defined in claim 6, wherein said representing means is formed so that the travel guiding information is represented as an arrow which shows a desired travel direction corresponding to the desired travel route.

8. An arrangement as defined in claim 7, wherein said representing means represents the travel guiding information on the display in a primary field of vision of a vehicle driver.

* * * * *